United States Patent
Krishnamurthy et al.

(10) Patent No.: US 7,916,664 B2
(45) Date of Patent: Mar. 29, 2011

(54) REVERSE ENGINEERING PEERING AT INTERNET EXCHANGE POINT

(75) Inventors: Balachander Krishnamurthy, New York, NY (US); Walter Willinger, Madison, NJ (US); Brice Augustin, Vitry sur Seine (FR)

(73) Assignee: AT&T Intellectual Property I, L.P., Reno, NV (US)

( * ) Notice: Subject to any disclaimer, the term of this patent is extended or adjusted under 35 U.S.C. 154(b) by 74 days.

(21) Appl. No.: 12/313,753

(22) Filed: Nov. 24, 2008

(65) Prior Publication Data

US 2010/0128633 A1 May 27, 2010

(51) Int. Cl.
*H04L 12/28* (2006.01)
(52) U.S. Cl. ...................................................... 370/254
(58) Field of Classification Search .................. 370/254, 370/351, 401
See application file for complete search history.

(56) References Cited

U.S. PATENT DOCUMENTS 6,009,081 A * 12/1999 Wheeler et al. ............... 370/255
2005/0198269 A1 * 9/2005 Champagne et al. ......... 709/224

OTHER PUBLICATIONS

On Properties of Internet Exchange Points and Their Impact on AS Topology and Relationship, by K. Xu, et al., Networking 2004, LNCS 3042, pp. 284-295, 2004.

* cited by examiner

*Primary Examiner* — Derrick W Ferris
*Assistant Examiner* — Mohammad Anwar (57) ABSTRACT

A technique for examining the relationships of autonomous systems (ASes) participating in an Internet Exchange Point (IXP) utilizes packet tracing servers proximate the IXPs. Where such packet tracing servers cannot be found in the participating ASes, the methodology identifies additional vantage points by looking at a list of ASes that are one hop away from the ASes at the IXP. The choice of one-hop away ASes is made judiciously by picking ones that have better connectivity, based on past-data. Plural-hop ASes may also be used where necessary.

18 Claims, 6 Drawing Sheets

REVERSE ENGINEERING PEERING AT INTERNET EXCHANGE POINT

FIELD OF THE INVENTION

The present invention relates generally to the topological analysis of the physical structure of the Internet, and more particularly, to the study of Internet Exchange Points (IXPs) and the peering of Autonomous Systems (ASes) at those IXPs.

BACKGROUND OF THE INVENTION

An Internet Exchange Point (IXP) permits various Internet Service Providers (ISPs) to exchange traffic at designated peering points. Numbering in the hundreds on the Internet today, IXPs are a key component of the physical infrastructure of the Internet.

Figure 1:
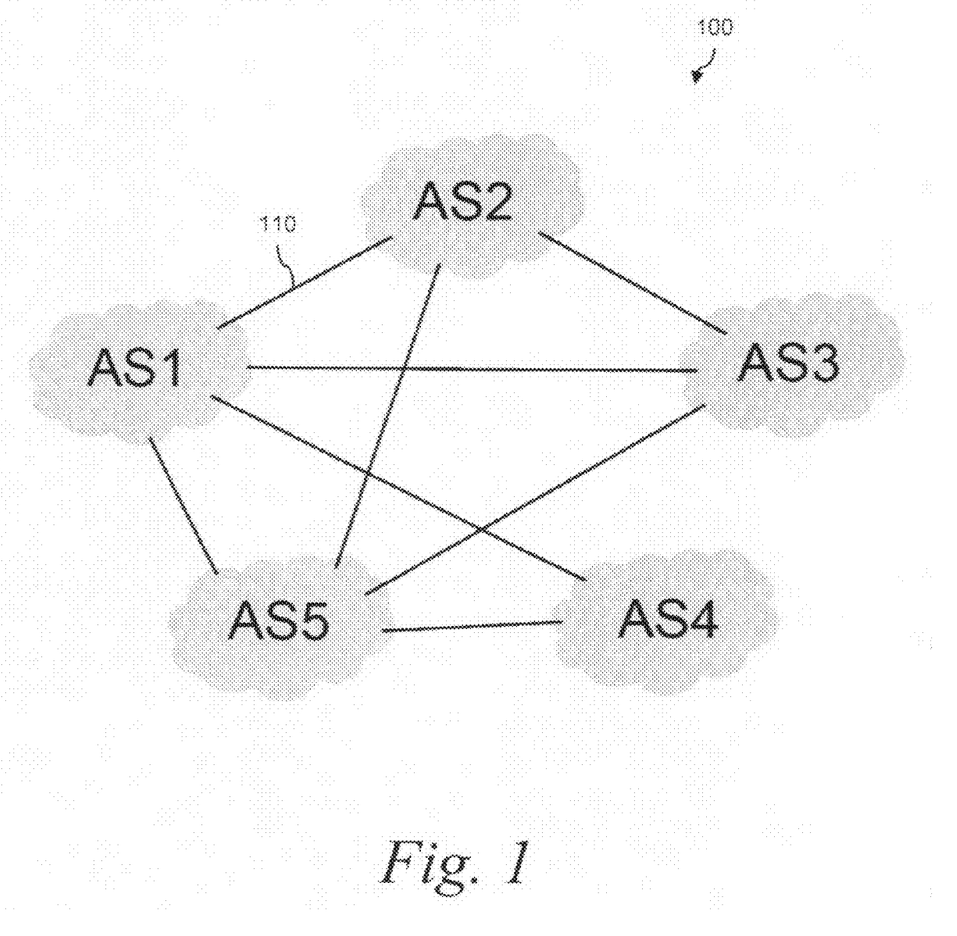
FIG. 1 is a schematic diagram illustrating AS peering in a network without an IXP.

A network 100, shown in FIG. 1, illustrates the peering of ASes in a network without an IXP. The network includes five ASes linked by connections such as connection 110 linking AS1 and AS2. The two ASes may interconnect using a dedicated circuit and may have a business arrangement regarding costs. A connection 110 may alternatively depend on an upstream provider and may traverse long physical distances between the ASes, even if the connected ASes are geographically close.

Figure 2:
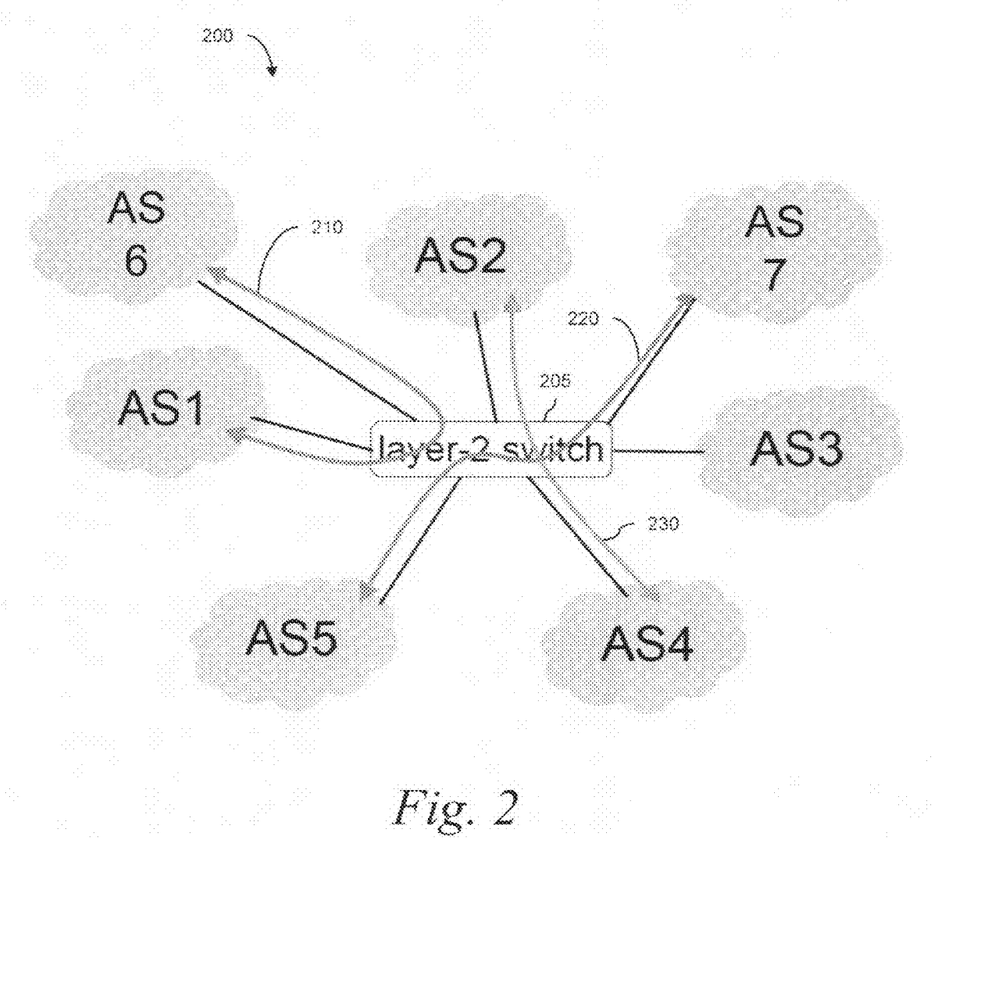
FIG. 2 is a schematic diagram illustrating AS peering in a network using an IXP.

A network 200, shown in FIG. 2, includes an exemplary IXP in the form of a layer-2 switch 205 and associated interfaces with seven ASes. One or more of the ASes may be content providers. The IXP provides peering among subscribing ASes. The arrow 210 represents a peering relationship between AS1 and AS6. Similarly, peering relationship 220 is between AS5 and AS7, and peering relationship 230 is between AS2 and AS4. An IXP keeps traffic local avoiding routing through long distance routes. The peering relationship may provide advantages to the participating subscribers in cost, latency, and bandwidth.

In the real Internet, thousands of ASes peer at several hundred IXPs and exchange a significant amount of traffic. One source estimates that IXPs carry in excess of 10TB of data per day. The peerings serve as a redundancy mechanism for ISPs while reducing dependency on upstream Tier 1 providers. Based on the amount of traffic exchanged in each direction, the costs can be distributed between the exchange points.

Members at an IXP can exchange traffic with all others connected to it, similar to hub airports where different airlines exchange passengers. Subscribers to a particular IXP, however, do not all necessarily peer with each other. For example, in the network 200, AS1 and AS5 do not have a peering relationship. A list of subscribers to a particular IXP therefore does not reveal which ASes have peering relationships.

Although IXPs carry a significant portion of Internet traffic today, little is known about them. IXPs are not visible to most topology research. The list of Internet Exchange Points (IXPs) is currently hand assembled based on contributions from individual IXPs. That list is neither complete nor accurate.

In order to obtain a list of members at an IXP, one must rely on possibly outdated voluntary information on the Internet. Previous efforts to assemble data on ASes subscribing to an IXP include efforts by the Cooperative Association for Internet Data Analysis (CAIDA) and Distributed Internet Measurements & Simulations (DIMES), which have relied on vantage points from which traditional "traceroute"-like tools are used to locate members at an IXP. Traceroute is a computer network tool used to determine the route taken by packets across an IP network.

The CAIDA approach used several dozen vantage points while the large DIMES method uses volunteers who contribute vantage points by issuing traceroute traces from many thousands of servers. In either case, the analysis of IXP member relationships has been performed by tracing packets from vantage points within the member networks. If vantage points within the members are not identified, potentially important information is missed. In spite of a large number of vantage points, existing methods do not identify vantage points for all members at all IXPs, resulting in members missing from the gathered data. Previous efforts to assemble data on IXPs are described, for example, in Y. He, G. Siganos, M. Faloutsos, S. V. Krishnamurthy, A systematic framework for unearthing the missing links: Measurements and Impact, USENIX/SIGCOMM NSDI 2007, Cambridge, Mass., USA, April 2007; K. Xu, Z. Duan, Z.-Li Zhang and J. Chandrashekar, Properties of Internet Exchange Points and Their Impact on AS Topology and Relationship, NETWORKING 2004, found at http://www.springerlink.com/content/jy3cj02rw121/?p=d5c0d5a48071465ca8b6547385e 273dc&pi=0.

There is recent anecdotal evidence of aggressive peering by certain ASes, especially large content providers. A significant portion of that peering activity takes place at the IXPs. By measuring traffic in IXPs, a researcher can get a broader idea of such shifts in traffic patterns. An IXP gives a focused view on the actual traffic traversing between ISPs at those points. There is need for an improved methodology for reverse engineering peering relationships among ASes at IXPs in the Internet to understand those relationships and to learn how IXPs evolve.

SUMMARY OF THE INVENTION

The present invention addresses the needs described above by providing a method for determining peering relationships of Antonymous Systems (ASes) at an Internet Exchange Point (IXP). Initially, a plurality of ASes subscribing to the IXP are identified, and a vantage AS is selected. If one or more packet tracing servers are available within the vantage AS, then a packet tracing server within the vantage AS is identified. If, on the other hand, a packet tracing server is not available within the vantage AS, and if one or more packet tracing servers are available in an AS located a single hop from the vantage AS, then a packet tracing server is identified in an AS located a single hop from the vantage AS.

An IP address in a target AS that is another of the plurality of ASes is also identified. A packet trace is then performed from the identified packet tracing server to the identified IP address. Based on whether the packet trace traverses the IXP, it is then determined whether the vantage AS and the target AS have a peer relationship at the IXP.

In a preferred embodiment, the packet tracing server is a traceroute server.

The step of identifying a plurality of ASes subscribing to the IXP may include the step of consulting at least one reference selected from the group consisting of PCH database, PeeringDB database and an IXP Web site. That step may include identifying an AS having an identifier contained in a DNS name of the IXP. The step may utilize border gateway protocol (BGP) tables.

The step of identifying a plurality of ASes subscribing to the IXP may utilize traceroute data.

The step of identifying a packet tracing server in an AS located a single hop from the vantage AS may further include selecting the packet tracing server based at least in part on connectivity measured using past data.

If a packet tracing server is unavailable within the vantage AS and unavailable within an AS located a single hop from the vantage AS, then a packet tracing server may be identified in an AS located a plurality of hops from the vantage AS. That packet tracing server may be selected based at least in part on connectivity measured using past data.

The steps of the method may be repeated, substituting each AS at the IXP as the vantage AS.

Another embodiment of the invention is a computer-usable medium having computer readable instructions stored thereon for execution by a processor to perform a method as described above.

DESCRIPTION OF THE INVENTION

The present invention addresses the missing members problem by looking for additional vantage points by growing the list of ASes using a novel technique. Specifically, if a vantage point within an AS member of an IXP is unavailable, the technique utilizes a list of alternative ASes that are one hop away from the ASes at the IXP. If a vantage point is contained within one of those alternative ASes, that vantage point is used as a starting point for tracing packets.

The choice of one-hop-away ASes is made judiciously, picking ASes that have better connectivity, based on past data. That novel technique of "growing vantage points" has yielded additional information about IXP members that were not visible using earlier techniques.

The method of the invention examines the relationship of ASes subscribing to a particular IXP. To identify IXPs on the Internet, several publicly available databases are available. One is the public IXP database available at Packet Clearing House (PCH), a non-profit research institute found on the Web at www.pch.net. The PCH database contains basic information about IXPs including geographic location, name, status, IP address blocks, IP version and some other attributes. While such publicly available databases are regularly maintained using manual or semi-manual techniques, the quality of the data is unknown.

Figure 3:
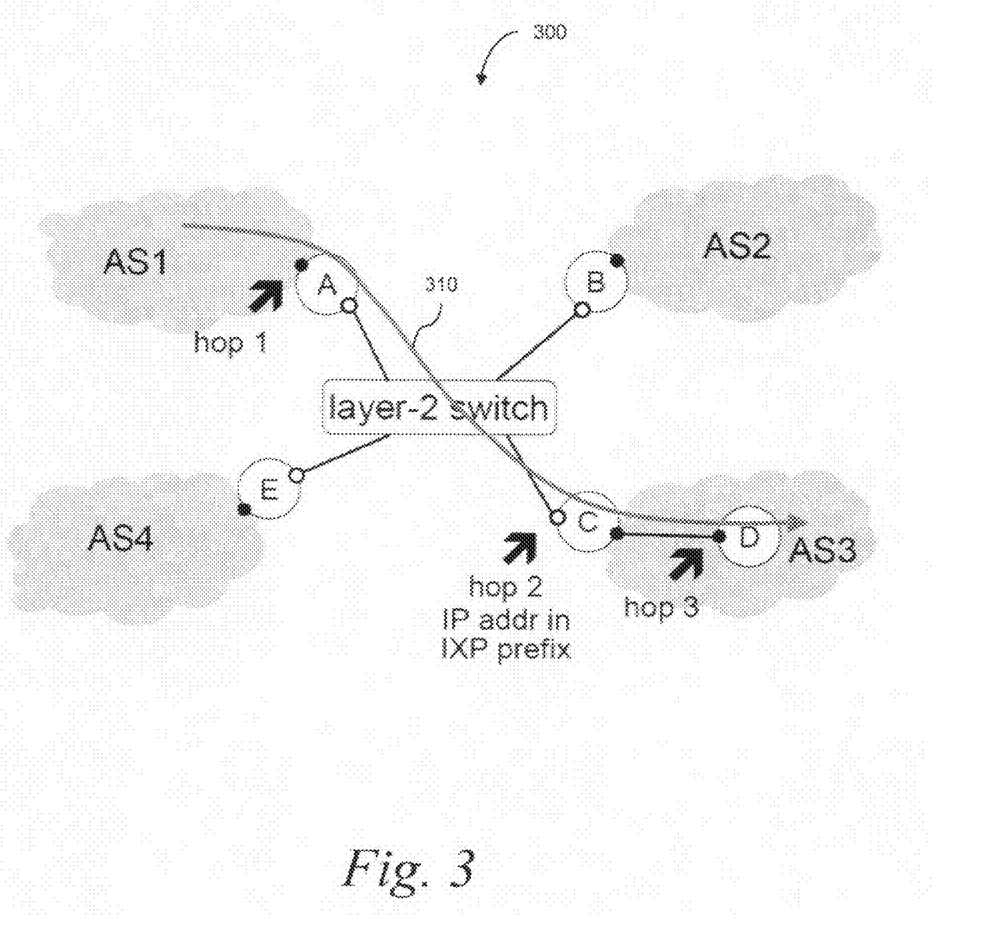
FIG. 3 is a schematic diagram of a network showing identification of IXPs in packet tracing data in accordance with the present invention.

IXPs may also be identified using IP addresses in traceroute data. For example, as illustrated by the network 300, shown in FIG. 3, a traceroute path 310 shows three hops. A first hop 1 is from a vantage point in AS1 to an IXP interface in router A (represented by a small circle). Hop 2 traverses the IXP layer-2 switch to an interface in router C. Hop 3 traverses AS3 between router C and router D. Traceroute data on hop 2 reflects the IP address in the IXP prefix. From that data, IXPs may be discovered.

Through the above technique, the prefixes of 164 of the approximately 200 IXPs on the Internet were obtained. While the technique is reasonably effective, the results are not exhaustive because not all IXPs advertise their prefixes.

The inventors have developed a technique for studying the relationships of ASes participating in a particular IXP. In an exemplary such method 400 (FIG. 4) in accordance with the invention, a plurality of ASes participating in a particular IXP on the Internet are initially identified (step 410). The participating ASes may be identified in a variety of ways. For example, the PCH database of IXPs contains partial lists of participants for many IXPs. Additionally, the database PeeringDB, a free database found on the Web at www.peeringdb.com, contains peering locations and participants. Websites of individual IXPs may also provide details on participating ASes.

Figure 4:
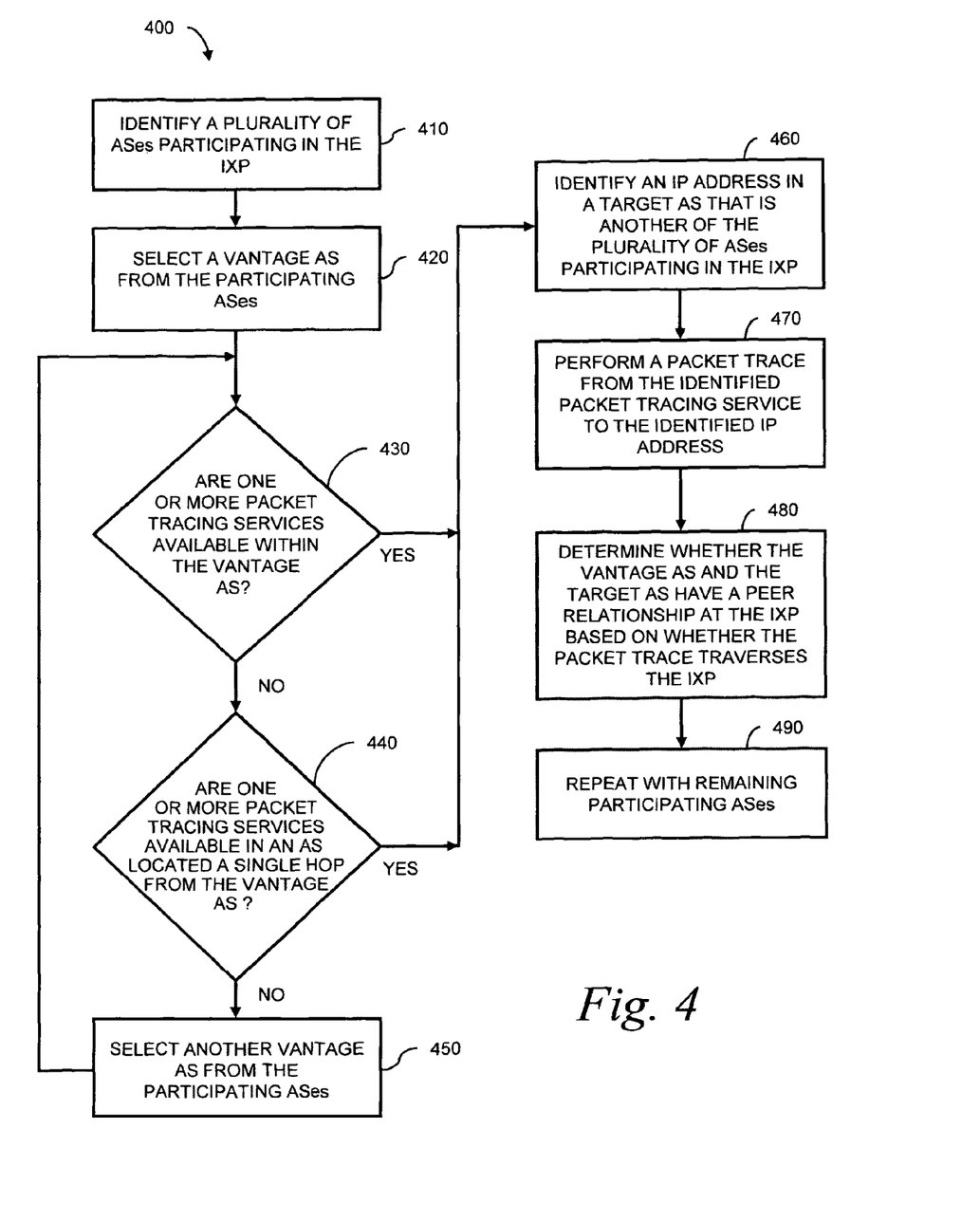
FIG. 4 is a schematic diagram showing a method for determining peering relationships at an IXP in accordance with the invention.

The participating ASes may be identified in other ways. An IXP may have a DNS name containing the name, number or another identifier of the AS, such as de-cix10.net.google.com or ams-ix2.ams.giganews.com. BGP tables may be assembled from route collectors that are implemented in a few IXPs, or may be inferred using a technique such as that taught by Z. Mao, J. Rexford, J. Wang, and R. Katz, Towards an accurate AS-level traceroute tool, Proc. ACM SIGCOMM, August 2003.

Returning to FIG. 4, once the participating ASes at an IXP have been identified, a vantage AS is selected (step 420) from those ASes. The vantage AS is preferably selected based on its visibility in the network. For example, BGP tables may be consulted to select an AS having a large number of IP prefixes. Other available criteria may also be used to identify ASes with high visibility. As an AS participating in the IXP, the vantage AS interfaces directly with a router that is part of the IXP. For example, as shown in the network 500 of FIG. 5, AS1 contains an IP address of the router A that is a router in the IXP.

It is then determined (step 430) whether a packet tracing server is available in the vantage AS. In a preferred embodiment of the invention, the packet tracing server is a traceroute server that is available for issuing traceroute traces from the location of the server to any specified IP address. Other services also list traceroute servers and other packet tracing servers. At least 1100 packet tracing servers in 73 countries are listed by www.traceroute.org and are publicly available for performing traceroute traces. By matching the network locations of known packet tracing servers with the location of the selected vantage AS, a packet tracing server in the vantage server may be found.

If a packet tracing server is found in the vantage AS, then an AS participating in the subject IXP (other than the vantage AS) is selected as a target AS. An IP address is identified (step 460) in the target AS. IP addresses within an identified AS are available in publicly available databases.

A packet trace is then performed (step 470) from the vantage AS to the target AS by issuing a Web server request to the identified packet tracing server to perform a trace to the identified IP address in the target AS.

In a preferred embodiment of the invention, the traceroute utility is used to trace the path from the vantage AS to the target AS. A traceroute trace functions by increasing the value of the "time-to-live" (TTL) field of each successive batch of packets sent. The first packets sent have a TTL value of one, and are therefore not forwarded by the next router and make only a single hop. The next packets have a TTL value of 2, and so on. When a packet passes through a host, normally the host decrements the TTL value by one, and forwards the packet to the next host. When a packet with a TTL of one reaches a host, the host discards the packet and sends an ICMP time exceeded (type 11) packet to the sender. The traceroute utility uses those returning packets to produce a list of hosts that the packets have traversed en route to the destination.

Other packet tracing or route tracing utilities may be used to determine the path from the vantage AS to the target AS without departing from the scope of the invention.

The results of the packet trace are then examined to determine (step 480) whether the vantage AS and the target AS have a peer relationship at the IXP. If it is found that a packet traveling from the vantage AS to the target AS traverses the IXP in a direct path, then it is inferred that the ASes have a peering relationship at the IXP. For example, in the path 510 (FIG. 5), a trace will include IP address #1 in AS1, which is the vantage AS, IP address #2 having a prefix in the IXP, and IP address #3 in AS3, which is the target AS. Because the trace includes an IP address of the IXP directly between IP addresses in the vantage and target ASes, it is inferred that those ASes have a peering relationship at the subject IXP.

The process of the invention is then repeated (step 490) by using the packet tracing server to trace routes to IP addresses in additional target Ases participating in the subject IXP. After all possible edges have been examined from the identified vantage AS, another vantage AS is selected. For example, an AS having the next highest number of IP prefixes may be selected as the next vantage AS. The tracing sequence is then repeated. In that way, a maximum number of edges are examined at each IXP.

Figure 5:
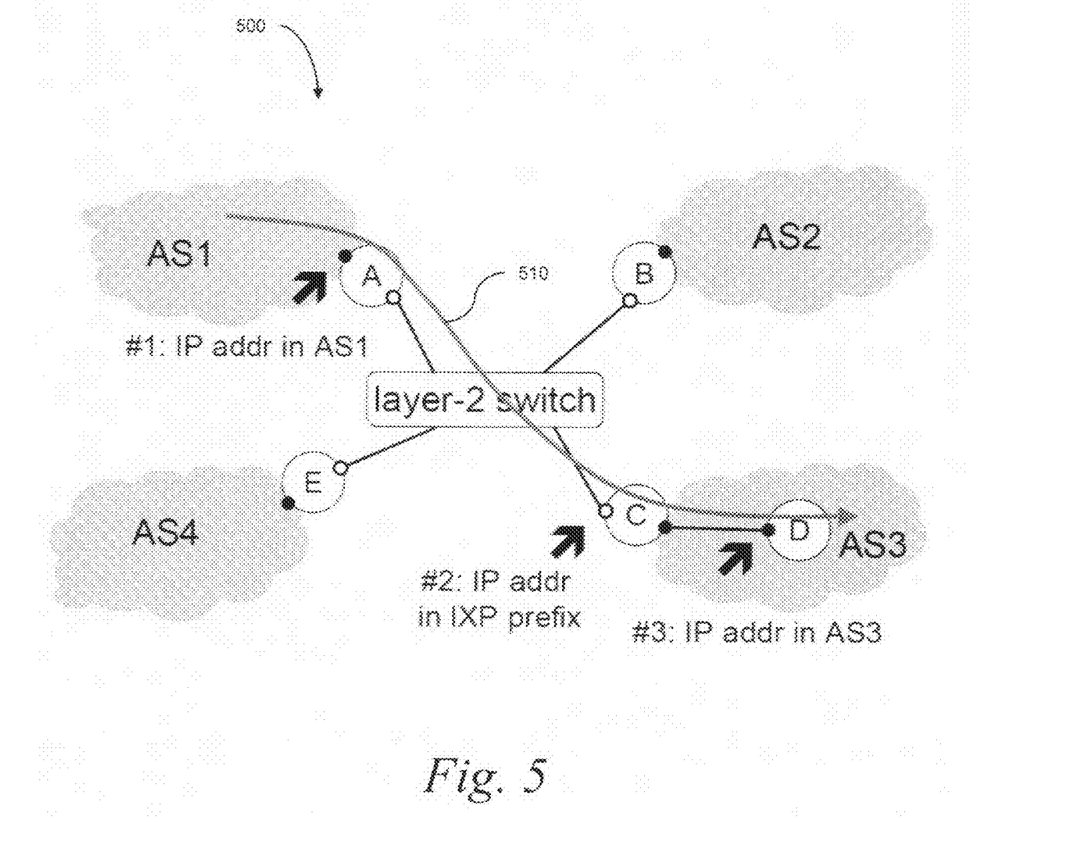
FIG. 5 is a schematic diagram of a network showing identification of peering in packet tracing data in accordance with the present invention.

In one study conducted by the inventors, it was found that, of the 500,000 possible edges (i.e., AS-to-AS relationships) to check, only approximately 150,000 could be checked directly in a path such as path 510, using a packet tracing server located within an AS that is participating in an IXP. Conversely, approximately 70% of the AS-to-AS relationships (approximately 350,000) were not possible to check using a packet tracing server directly located in one of the participant ASes because no such packet tracing server could be identified.

Returning to FIG. 4, in those instances where a packet tracing server is not identifiable within a participant vantage AS, the technique of the present invention next examines (step 440) those ASes located a single hop from the participant AS. The inventors have recognized that, if a peering relationship exists between vantage and target ASes, those "single-hop" ASes have a high probability of transmitting packets that are addressed to the target AS through the vantage AS and through the IXP. The single-hop ASes are therefore very effective in evaluating AS peering relationships at an IXP where no packet tracing server is available in the vantage AS.

For example, if it is found that a regional provider AS participating in an IXP does not contain any identifiable packet tracing servers, then that regional provider's customers, which may be local providers, are examined to determine whether they contain a packet tracing server. Those ASes, which are a single hop from the participating AS, would be likely to transmit outgoing packets through the participating AS and through the IXP, and could therefore be viable substitutes for the participating AS in initiating packet traces for the purpose of the invention.

Figure 6:
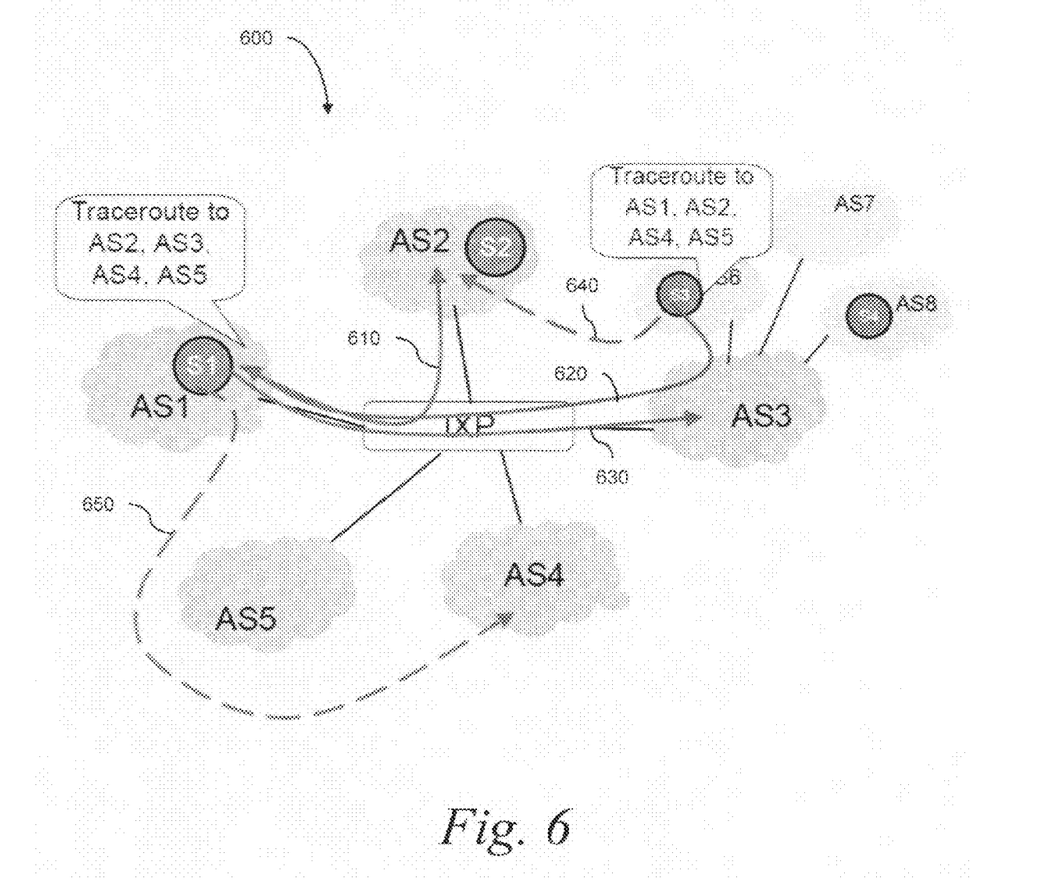
FIG. 6 is a schematic diagram of a network showing exemplary packet traces in accordance with the present invention.

An implementation of the invention will be illustrated using the network 600 of FIG. 6. A packet tracing server S1 has been identified in AS1, and server requests for packet traces to IP addresses in AS2, AS3, AS 4 and AS5 have been issued to the server S1. The resulting traces are shown. The trace 610 traverses the IXP en route to AS2, revealing a peering relationship between AS1 and AS2 at the IXP. Similarly, the trace 630 traverses the IXP en route to AS3, revealing a peering relationship between AS1 and AS3 at the IXP.

The trace 650 between AS1 and AS4 does not traverse the subject IXP, indicating that, although both AS1 and AS4 are participants in the subject IXP, it cannot be concluded whether those ASes have a peering relationship at that IXP. Those ASes might, instead, have direct peering connectivity, as shown in FIG. 1, or may have no peer relationship.

The illustrated network 600 also illustrates traces for evaluating the peering relationships of AS3. AS3, however, was found not to include a packet tracing server. Three ASes were found one hop away from AS3: AS6, AS7 and AS8. Within those one-hop ASes, a packet tracing server S3 was found in AS6 and a packet tracing server S4 was found in AS8. The packet tracing server S3 was selected based on superior historical connectivity data as compared to S4.

Server requests for packet traces to IP addresses in AS1, AS2, AS4 and AS5 were issued to the server S3. The trace 620 traverses the IXP en route through AS3 to AS1, revealing a peering relationship between AS3 and AS1 at the IXP.

In contrast, the packet trace 640 between AS6 and AS2 does not traverse the subject IXP, nor does it traverse AS3. The trace 640 likely indicates that AS3 and AS2 do not have a peering relationship at the IXP. Those results, however, are slightly more ambiguous than those obtained using a packet tracing server located directly in the participating AS, such as the trace 650. That is because the trace 640 may instead indicate that AS6 and AS2 have a direct peering relationship. Other data relating to that relationship, such as data indicating a regional provider/customer relationship between AS6 and AS2, may be used to disambiguate those results.

Beyond the one-hop methodology described above, selective growing may be performed to use 2-hop- and 3-hop-away ASes as well, using an iterative procedure. The inventors have found that, of the 350,000 AS-to-AS edges where there is no identifiable packet tracing server directly located in one of the participants, approximately 50,000 are not possible to check using a one-hop method according to the invention. In those situations, plural-hop ASes may be carefully selected to originate packet traces.

In general, the invention allows for targeted growth of vantage ASes, from which it is possible to examine paths through the IXP which will help reverse engineer the list of its members, and their relationships.

The foregoing Detailed Description is to be understood as being in every respect illustrative and exemplary, but not restrictive, and the scope of the invention disclosed herein is not to be determined from the Description of the Invention, but rather from the Claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. A method for determining peering relationships of autonomous systems at an Internet exchange point, the method comprising: identifying a plurality of autonomous systems participating in the Internet exchange point ;selecting a vantage autonomous system from the plurality of autonomous systems; determining that no packet tracing server is available within the vantage autonomous system by a computer processor; identifying a packet tracing server by a computer processor in a second autonomous system located a single hop from the vantage autonomous system, the second autonomous system not participating in the Internet exchange point; identifying an IP address in a target autonomous system that is another of the plurality of autonomous systems participating in the Internet exchange point by a computer processor; performing a packet trace from packet tracing server to the IP address by the processor of a packet tracing server; determining whether the vantage autonomous system and the target autonomous system have a peer relationship at the Internet exchange point based on whether the packet trace traverses the Internet exchange point by a computer processor.

2. The method of claim 1, wherein the packet tracing server is a traceroute server.

3. The method of claim 1, wherein identifying a plurality of autonomous systems participating in the Internet exchange point includes:
consulting at least one reference selected from the group consisting of Packet Clearing House database, PeeringDB database and an Internet exchange point Web site.

4. The method of claim 1, wherein identifying a plurality of autonomous systems participating in the Internet exchange point includes:
identifying an autonomous system having an identifier contained in a DNS name of the Internet exchange point.

5. The method of claim 1, wherein identifying a plurality of autonomous systems participating in the Internet exchange point utilizes border gateway protocol tables.

6. The method of claim 1, wherein identifying a plurality of autonomous systems participating in the Internet exchange point utilizes traceroute data.

7. The method of claim 1, wherein identifying a packet tracing server in a second autonomous system located a single hop from the vantage autonomous system further includes:
selecting the packet tracing server based at least in part on connectivity measured using past data.

8. The method of claim 1, wherein selecting a vantage autonomous system from the plurality of autonomous systems further includes:
selecting the vantage autonomous system based on a visibility of the autonomous system in the network.

9. The method of claim 1, further comprising:
repeating the steps, substituting another autonomous system from the plurality of autonomous systems as the vantage autonomous system.

10. A non-transitory computer readable medium having computer readable instructions stored thereon for execution by a processor to perform a method for determining peering relationships of autonomous systems at an Internet exchange point, the method comprising:
identifying a plurality of autonomous systems participating in the Internet exchange point;
selecting a vantage autonomous system from the plurality of autonomous systems,
determining that no packet tracing server is available within the vantage autonomous system;
identifying a packet tracing server in a second autonomous system located a single hop from the vantage autonomous system, the second Autonomous System not participating in the Internet exchange point;
identifying an IP address in a target autonomous system that is another of the plurality of autonomous systems participating in the Internet exchange point;
performing a packet trace from the packet tracing server to the IP address; and
determining whether the vantage autonomous system and the target autonomous system have a peer relationship at the Internet exchange point based on whether the packet trace traverses the Internet exchange point.

11. The non-transitory computer readable medium of claim 10, wherein the packet tracing server is a traceroute server.

12. The non-transitory computer readable medium of claim 10, wherein identifying a plurality of autonomous systems subscribing to the Internet exchange point includes:
consulting at least one reference selected from the group consisting of Packet Clearing House database, PeeringDB database and an Internet exchange point Web site.

13. The non-transitory computer readable medium of claim 10, wherein identifying a plurality of autonomous systems participating in the Internet exchange point includes:
identifying an autonomous system having an identifier contained in a DNS name of the Internet exchange point.

14. The non-transitory computer readable medium of claim 10, wherein the step of identifying a plurality of autonomous systems participating in the Internet exchange point utilizes border gateway protocol tables.

15. The non-transitory computer readable medium of claim 10 wherein identifying a plurality of autonomous systems participating in the Internet exchange point utilizes traceroute data.

16. The non-transitory computer readable medium of claim 10, wherein identifying a packet tracing server in a second autonomous system located a single hop from the vantage autonomous system further includes:
selecting the packet tracing server based at least in part on connectivity measured using past data.

17. The non-transitory computer readable medium of claim 10, wherein selecting a vantage autonomous system from the participating autonomous systems further includes:
selecting the vantage autonomous system based on a visibility of the autonomous system in the network.

18. The non-transitory computer readable medium of claim 10, wherein the method further comprises:
repeating the method, substituting another autonomous system from the plurality of autonomous systems as the vantage autonomous system.

* * * * *